(12) United States Patent
Singh et al.

(10) Patent No.: US 8,189,663 B2
(45) Date of Patent: May 29, 2012

(54) METHOD OF SELECTING QUANTIZER VALUES IN VIDEO COMPRESSION SYSTEMS

(75) Inventors: Kismat Singh, Bitterne (GB); Philip Graham White, Eastleigh (GB); Matthew Patrick Compton, Winchester (GB)

(73) Assignee: Ericsson AB, Stockholm (SE)

( * ) Notice: Subject to any disclaimer, the term of this patent is extended or adjusted under 35 U.S.C. 154(b) by 1138 days.

(21) Appl. No.: 12/004,369

(22) Filed: Dec. 20, 2007

(65) Prior Publication Data
US 2008/0165845 A1 Jul. 10, 2008

(30) Foreign Application Priority Data

Dec. 21, 2006 (GB) .................................. 0625610.1

(51) Int. Cl.
*H04N 7/12* (2006.01)
*H04N 11/02* (2006.01)
*H04N 11/04* (2006.01)
(52) U.S. Cl. ............................ 375/240.03; 375/240.16
(58) Field of Classification Search ................... 375/240
See application file for complete search history.

(56) References Cited

U.S. PATENT DOCUMENTS

| 5,323,187 | A | * | 6/1994 | Park .......................... 375/240.04 |
| 5,585,853 | A | | 12/1996 | Juri et al. |
| 5,640,159 | A | | 6/1997 | Furlan et al. |
| 5,699,119 | A | * | 12/1997 | Chung et al. ............. 375/240.04 |
| 7,848,579 | B2 | * | 12/2010 | Chiba et al. .................. 382/232 |
| 2004/0190623 | A1 | * | 9/2004 | Lunter ..................... 375/240.16 |
| 2005/0008075 | A1 | | 1/2005 | Chang |
| 2005/0063472 | A1 | * | 3/2005 | Vella et al. ............... 375/240.22 |
| 2006/0083310 | A1 | * | 4/2006 | Zhang ..................... 375/240.16 |

FOREIGN PATENT DOCUMENTS

DE 3414982 A1 10/1985

* cited by examiner

*Primary Examiner* — Xavier Szewai Wong (57) ABSTRACT

A method of obtaining a quantization value for macroblocks of a picture for video compression includes estimating 11, for a plurality of quantization values, a size of the picture in terms of a sum of all quantized coded coefficients. A linear relationship between a size of a macroblock and Activity of the macroblocks is assumed 12, where the Activity of the macroblock is the number of coded coefficients in the macroblock before discarding any coefficients or quantizing the remaining coefficients. The macroblocks are divided 13 into groups by their Activity level such that substantially a same number of pre-quantization coefficients are in each group. An average Activity of each group is determined 14. A quantization value for each group is determined 15 from the assumed linear relationship between a number of bits per macroblock and Activity of the macroblocks and the average Activity of the group, as imposed by a predetermined bit rate.

6 Claims, 5 Drawing Sheets

| Activity Range | No Of MBs in range | Mid-Range value | Area= No.in range*MidRange | Cumulative Area | Threshold Position |
|---|---|---|---|---|---|
| 0-7 | 92 | 4 | 368 | 368 | |
| 8-15 | 230 | 12 | 2760 | 3128 | |
| 16-23 | 627 | 20 | 12540 | 15668 | |
| 24-31 | 521 | 28 | 14588 | 30256 | |
| 32-39 | 218 | 36 | 7848 | 38104 | Threshold 1 |
| 40-47 | 168 | 44 | 7392 | 45496 | |
| 48-55 | 152 | 52 | 7904 | 53400 | |
| 56-63 | 148 | 60 | 8880 | 62280 | |
| 64-71 | 134 | 68 | 9112 | 71392 | |
| 72-79 | 114 | 76 | 8664 | 80056 | Threshold 2 |
| 80-87 | 135 | 84 | 11340 | 91396 | |
| 88-95 | 106 | 92 | 9752 | 101148 | |
| 96-103 | 99 | 100 | 9900 | 111048 | |
| 104-111 | 91 | 108 | 9828 | 120876 | Threshold 3 |
| 112-119 | 62 | 116 | 7192 | 128068 | |
| 120-127 | 51 | 124 | 6324 | 134392 | |
| 128-135 | 52 | 132 | 6864 | 141256 | |
| 136-143 | 22 | 140 | 3080 | 144336 | |
| 144-151 | 15 | 148 | 2220 | 146556 | |
| 152-159 | 11 | 156 | 1716 | 148272 | |
| 160-167 | 5 | 164 | 820 | 149092 | |
| 168-175 | 3 | 172 | 516 | 149608 | |
| 176-183 | 3 | 180 | 540 | 150148 | |
| 184-191 | 0 | 188 | 0 | 150148 | |
| 192-199 | 1 | 196 | 196 | 150344 | |
| 200-207 | 0 | 204 | 0 | 150344 | |
| 208-215 | 0 | 212 | 0 | 150344 | |
| 216-223 | 0 | 220 | 0 | 150344 | |
| 224-231 | 0 | 228 | 0 | 150344 | |
| 232-239 | 0 | 236 | 0 | 150344 | |
| 239-247 | 0 | 244 | 0 | 150344 | |
| 248-256 | 0 | 252 | 0 | 150344 | |
| | | Total Area: | 150344 | | |
| | | 1/4 Area: | 37586 | See threshold 1 | |
| | | 1/2 Area: | 75172 | See threshold 2 | |
| | | 3/4 Area: | 112758 | See threshold 3 | |

Figure 3

| Activity Range | No Of MBs |
|---|---|
| 0-7 | 92 |
| 8-15 | 230 |
| 16-23 | 627 |
| 24-31 | 521 |
| 32-39 | 218 |
| 40-47 | 168 |
| 48-55 | 152 |
| 56-63 | 148 |
| 64-71 | 134 |
| 72-79 | 114 |
| 80-87 | 135 |
| 88-95 | 106 |
| 96-103 | 99 |
| 104-111 | 91 |
| 112-119 | 62 |
| 120-127 | 51 |
| 128-135 | 52 |
| 136-143 | 22 |
| 144-151 | 15 |
| 152-159 | 11 |
| 160-167 | 5 |
| 168-175 | 3 |
| 176-183 | 3 |
| 184-191 | 0 |
| 192-199 | 1 |
| 200-207 | 0 |
| 208-215 | 0 |
| 216-223 | 0 |
| 224-231 | 0 |
| 232-239 | 0 |
| 239-247 | 0 |
| 248-256 | 0 |

METHOD OF SELECTING QUANTIZER VALUES IN VIDEO COMPRESSION SYSTEMS

This invention relates to a method of selecting quantizer values in video compression systems.

Video compression systems use a variety of techniques to reduce a bit rate required to carry a television signal. Among these is grouping of a contiguous sequence of complete pictures or frames, in which coding is performed with reference to a particular key picture in the sequence and remaining pictures in the sequence are coded by prediction from this key picture. Such a reference picture in a sequence is known as an Intra picture and is a first coded picture in a group of pictures (GOP) in video compression systems such as those defined by the Joint Video Team (JVT) of the ISO/IEC Moving Picture Expert Group (MPEG) and ITU-T Video Coding Experts Group (VCEG).

Typically, two types of predicted pictures are used: a P picture which is predicted from one temporal direction from the key picture—either forwards or backwards, and a B picture which is coded by interpolation from both forward and backward directions. Since the predicted pictures (P pictures) and bi-directionally predicted pictures (B pictures) build upon the Intra pictures (I pictures), it is essential to code these Intra pictures in an efficient manner and substantially devoid of any artefacts. For the purposes of convenient and efficient processing, each picture is divided into a set of pixel arrays typically 16×16 pixels in size and called macroblocks (MB) which, in the syntax of typical picture coding standards, are individually allocated certain parameters one of which is a Quantisation Parameter (Qp), or quantizer value, which defines a degree of quantisation applied in a MB. Selection of an appropriate quantizer value, Qp, for each of the macroblocks (MB) plays an important role in avoiding artifacts in the Intra pictures. The Qp value is such that a low value quantises lightly and leads to more bits being allocated to code a given MB, and thus increases transmitted bit rate and maintains good picture quality. Conversely, a high value of Qp quantises more coarsely and leads to fewer bits being used for coding and a reduced bit rate, but also a higher likelihood of impaired picture quality.

A number of factors need to be taken into account for selecting the quantizer value.

Artefacts are more visible in low Activity areas than in high Activity areas and so the quantizer value is preferably selected based on the Activity of the MB. The Activity could be defined as the degree of variation among the pixel values comprising the MB, measured, for example, by means of a ratio of maximum to minimum pixel values or any other appropriate spatial or time domain statistical measure. However, during the coding process, when the MB pixel values in each MB array are transformed from the spatial domain to the transform domain, an array of coefficients is produced whose values represent a frequency domain analysis of the picture data. In the compression process some of these coefficients are discarded and the remainder are quantised to a degree determined by the rate control mechanism expressed through the parameter Qp, before some form of entropy coding. After this the resultant data for each MB is placed in a coder buffer store. Because this data from the transform domain is the actual data flow that is transmitted, it is advantageous to use some statistical measure of this data taken over each whole picture rather than a measure taken in the spatial domain. One suitable and convenient measure is a normalised sum of all coded coefficients in each MB; when calculated before the quantisation stage, that is before any coefficients are discarded or the remaining coefficients quantised, this parameter is indicative of the so-called Activity of the MB. One such normalisation may be done over whole pictures and consists of adding up all coefficient values used for each MB and dividing this number by an average number of coefficient values used by all the MBs in a picture. According to this Activity measure, a MB with a significant amount of detail, i.e. large variations in pixel amplitudes or numerous objects with edges etc., will have a relatively large Activity, whereas a MB with few edges, few objects and small variations of pixel values will have low Activity. Whereas this process is performed primarily on the luminance components of the pixel values and their transform domain counterparts, the process may also take the chrominance components into account in calculating an overall Activity value. The two chrominance components are then treated in a similar fashion to the luminance component and their Activity values combined, for example by adding them directly to that of the luminance either prior to normalisation or afterwards. Because the amount of data in either chrominance channel may be consistently less than that in the luminance channel, a correction factor is required to adjust the chrominance Activity values which can then be combined with that of the luminance either by normalising a suitably weighted sum of the luminance and two chrominance Activity values to produce an overall value or alternatively by a weighted sum of the individual normalised values. The weighting can take account of different amounts of data generated by luminance and chrominance.

A difference between the quantizer value of a given MB and the quantizer values of neighbouring MBs of similar Activity should not be too large otherwise the MB boundaries will be visible.

The quantizer value should be selected so that MBs of a same Activity level are allocated a same quantizer value. For example, objects in a picture of constant Activity should have a constant quantiser value across them or the boundaries (between quantiser values) will become obvious.

The quantizer value must be chosen such that the picture can be encoded with a limited number of bits.

There is therefore a requirement for a method of selecting quantizer values that meet these requirements, before an intra frame is fully coded.

According to the invention there is provided a method of obtaining a quantisation value for macroblocks of a picture for video compression comprising the steps of: estimating sizes of a picture in terms of a sum of all coded coefficients for a plurality of quantisation values; assuming a relationship between a size of a macroblock and Activity of the macroblock; dividing macroblocks into groups by Activity; determining an average Activity of each group; and calculating a quantisation value for each group from the assumed relationship between a number of bits per macroblock and Activity of the macroblock and the average Activity of the group, imposed by a predetermined bit rate.

Preferably, estimating sizes of a picture comprises using a simplified coding process including a simple transform, quantisation and variable length coding.

Conveniently, using a simplified coding process comprises using an approximation of the H264 CABAC entropy encoding standard.

Preferably, estimating sizes of a picture dependent on a plurality of quantisation values comprises estimating over a range of quantizer values selected to cover most of a quantisation space of a compression standard.

Advantageously, assuming a relationship comprises assuming a linear relationship in which the constants may be determined by a least squares estimation.

Conveniently, dividing macroblocks into groups by Activity comprises determining a normalised sum of coded coefficients as a measure of the Activity of each macroblock.

The invention will now be described, by way of example, with reference to the accompanying drawings in which.

In the Figures, like reference numbers denote like parts.

Figure 1:
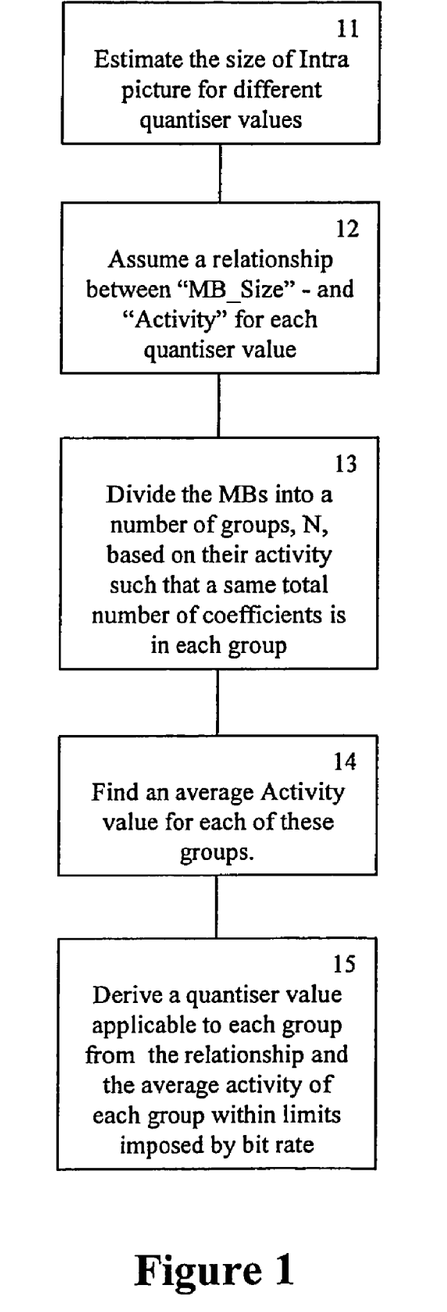
FIG. 1 is a flowchart of a method according to the invention.

Referring to FIG. 1, the method of the invention can be specified in terms of the following steps:

1. Estimate 11 the size in the transform domain, after discarding some coefficients and quantising the remaining coefficients, of each Intra picture for a number of different quantizer values. A simplified but adequate coding process is used to simulate a complete process and to obtain an estimated value for the total number of bits needed by each MB—indicated by the parameter "MB_Size" for each MB. For each MB there is a set of separate values of MB-Size based on the chosen Qp but only one value of Activity for each MB.

Figure 2:
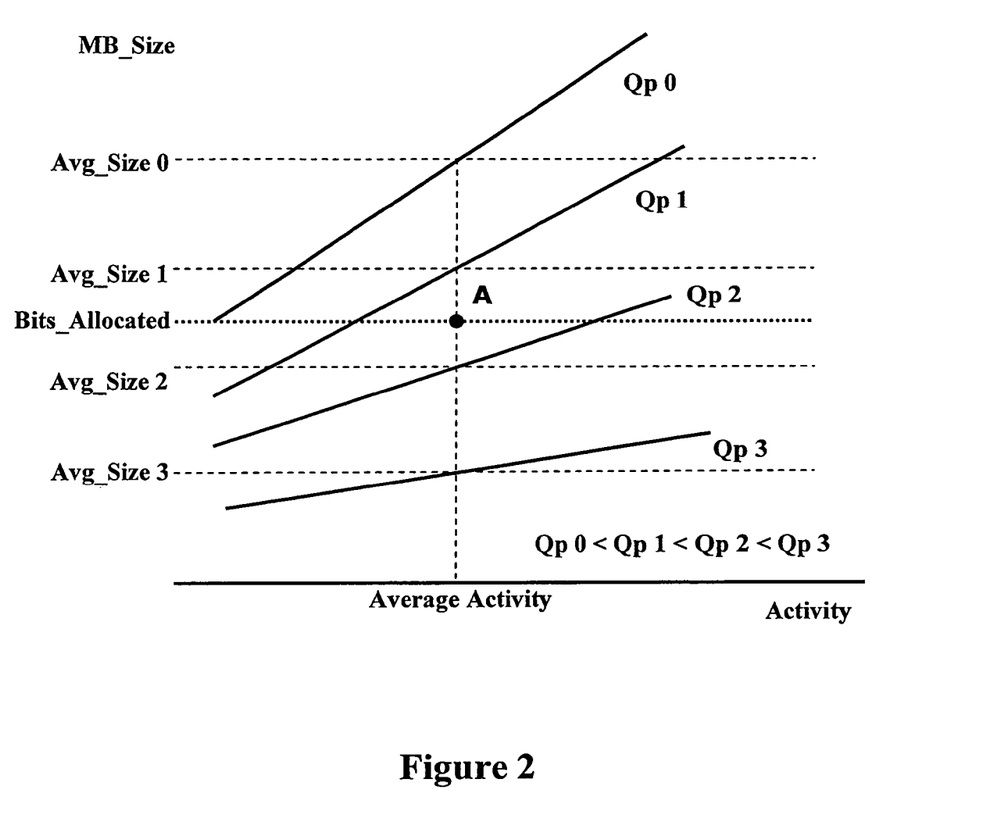
FIG. 2 is a graph of relationships between macroblock size (MB_Size) and Activity for different quantizer values (Qp) values.

2. Assume 12 an empirically determined relationship between the size of the resultant MBs—expressed by the parameter "MB_Size"—and the behaviour of their content—expressed by the parameter "Activity" (see further below). FIG. 2 illustrates this as a linear relationship for the example for four different Qp values which therefore produces four different values of MB_size for any given Activity value.

3. Calculate the Activity value for each MB by adding up the values of all its transform domain coefficients prior to discarding any coded coefficients and any quantisation. Divide 13 the MBs into a number of groups, N, based on their Activity. Find the average Activity value for each of these groups.

4. Use the relationship assumed in step 2 between the MB_Size and its Activity for each quantiser value and the average Activity of each group (calculated in step 3) to derive 15 a quantiser value applicable to each group.

FIG. 2 illustrates an example of this relationship, in particular the four MB_Size values generated by four different Qp values are predicted candidates for comparison in total with the affordable quantised size of the picture set by the available capacity i.e. by the current bit rate calculated by the rate control. The total values of MB_Size for each group for the specific values of Qp and Activity that apply are given values Avg_Size [0] to Avg_Size [3] in FIG. 2. The affordable size of each MB group—denoted by the parameter "Bits_Allocated" in FIG. 2—is compared with these several values of Avg_Size[i] for i from 0 to the maximum used, 3 in the example shown here. The relevant Qp value and the associated linear coefficients of the relationship of MB_Size to Activity are obtained by best fit interpolation between the candidate data (see further description below) as illustrated by FIG. 2 where the point A, determined from the given values of Activity and Bits_Allocated, shows where the current operating point is placed among the candidates.

As it is typical that the point A, which changes from MB to MB, will not always lie exactly on one of the calculated lines, and may occasionally fall outside the range of values explored, there is need for extrapolation rather than interpolation to find the appropriate value of Qp.

Normally it is expected that, once the procedure is completed, the quantizer value is fixed for each MB group. The detailed description of each step is as follows.

Step 1

Referring to FIG. 1, the size in the transform domain of an Intra picture, after discarding some coefficients and quantisation of the remaining coefficients, is estimated 11 over a predefined range of quantizer values Qp selected to cover most of a total quantisation space in a video compression standard. The estimation may be done using a simplified coding process comprising a simple transform, quantisation and variable length coding in order to make the estimation less complex. Such a simplified process may be implemented, for example, using an approximation of the H264 CABAC entropy encoding standard, but any other appropriate simplified scheme may be used. The process will henceforth herein be referred to as the Simple Estimation process.

It has been found, using a wide range of simulations, that there is a strong linear correlation between the sizes of coded pictures determined using a suitable Simple Estimation process and those obtained from the final, complete compression algorithm, even if this compression algorithm is complex and consists of intra predictions and context adaptive binary arithmetic coding. This correlation is exploited prior to the main coding operation to predict the size of Intra pictures for a particular compression algorithm with high accuracy. The estimated number of bits per MB using such a relation is defined as MB_Size.

Step 2

A sum of all coefficients, before discarding coefficients and quantisation of the remaining coefficients, or some other suitable statistical parameter, is defined as Activity, which may be normalised for convenience of calculation. The relation between the parameters Activity and MB_Size is assumed to be linear for a particular quantizer value and may therefore be found by using Least Square Estimation. Thus:

$$MB\_Size = a(Qp) * Activity + b(Qp) \qquad (1)$$

where $a(Qp)$ and $b(Qp)$ are functions of the quantisation value and defined by the following relationships:

$$a = \frac{MBCount * \sum_{i=1}^{n}(Activity_i * MB\_Size_i) - \sum_{i=1}^{n}(Activity_i) * \sum_{i=1}^{n}(MB\_Size_i)}{MBCount * \sum_{i=1}^{n}(Activity_i)^2 - \sum_{i=1}^{n}(Activity_i) * \sum_{i=1}^{n}(Activity_i)} \qquad (2)$$

-continued $$b = \frac{\sum_{i=1}^{n}(Activity_i)^2 * \sum_{i=1}^{n}(MB\_Size_i) - \sum_{i=1}^{n}(Activity_i * MB\_Size_i) * \sum_{i=1}^{n}(Activity_i)}{MBCount * \sum_{i=1}^{n}(Activity_i)^2 - \sum_{i=1}^{n}(Activity_i) * \sum_{i=1}^{n}(Activity_i)} \quad (3)$$

where:
MBCount=total number of macroblocks in consideration, typically the number in a complete picture
$Activity_i$=a measure of the Activity of the ith macroblock
$MB\_Size_i$=size of the ith macroblock
n=number of MBs in a picture, the maximum value of MB_Count being n.

Step 3

In conventional video compression coding system design it is usual and convenient to allocate a constant quantizer value Qp over a whole picture i.e. all MBs are coded with a same value of Qp. This is done for simplicity and for cost reduction reasons. However, use of a constant Qp value can lead to poor coding quality and it is advantageous to use the full scope of the specification provisions, such as MPEG 2 and MPEG 4, which allow each MB its own value of Qp, but without generating excessive amounts of data which exceed that allowed maximum bit rate. How this may be achieved efficiently is the subject of this invention.

Coding artefacts are more visible in the low Activity areas than in high Activity areas, when a same quantizer value is chosen for a whole picture. For example, in a typical football scene, part of the picture is grass while part will comprise the crowd, so choosing a same quantizer value for all MBs will result in more bits being used for the high Activity crowd portions and fewer bits for the low Activity grass. This results in undesirable artefacts in depiction of the grass. Therefore, according to the present invention, a same number of bits is allocated to all MBs sharing similar Activity but also to allocate bits such that the lower Activity areas gain a greater proportion of bits than the high Activity areas. This process beneficially redistributes the impairing artefacts in a more appropriate manner thus providing a more subjectively pleasing picture quality. In practice the intention is to assign a same number of bits to all MBs irrespective of Activity. To do this it is necessary for low Activity MBs to have a lower value of quantizer value than high Activity MBs. It is necessary to have a relation between the Activity and the number of bits it is desired to assign a MB and assigning a same number of bits to all MBs works quite well in practice.

To realise this benefit a histogram is first compiled of the number of macroblocks for each level of Activity. The total area under the histogram, which corresponds to the total number of coded coefficients in a picture before discarding coefficients and quantisation of the remaining coefficients, is calculated and is then divided into a number of groups of MBs, such that each group has a same area, i.e. same number of coded coefficients before quantisation, within the histogram. Using this principle of equal areas of Activity, thresholds of numbers of MBs separating the groups are calculated on a picture by picture basis. The number of groups may vary from picture to picture.

Whilst the use of histograms of coding parameters in informing coding choices is known, the method according to the invention is new in providing a dynamic division of the whole range of MB behaviour represented in the histogram into a number of groups which are then allocated certain common coding parameter values. This process is still performed on a picture by picture basis appropriately to meet the constraints set by the current bit rate (whether constant or variable) and by the rate control mechanism but is subject to finer adjustment within each picture such that the picture quality is optimised by the beneficial distribution of the quantizer value, Qp, over the whole picture on a basis of a different quantisation value for each group of MBs with similar behaviour.

Figure 3:
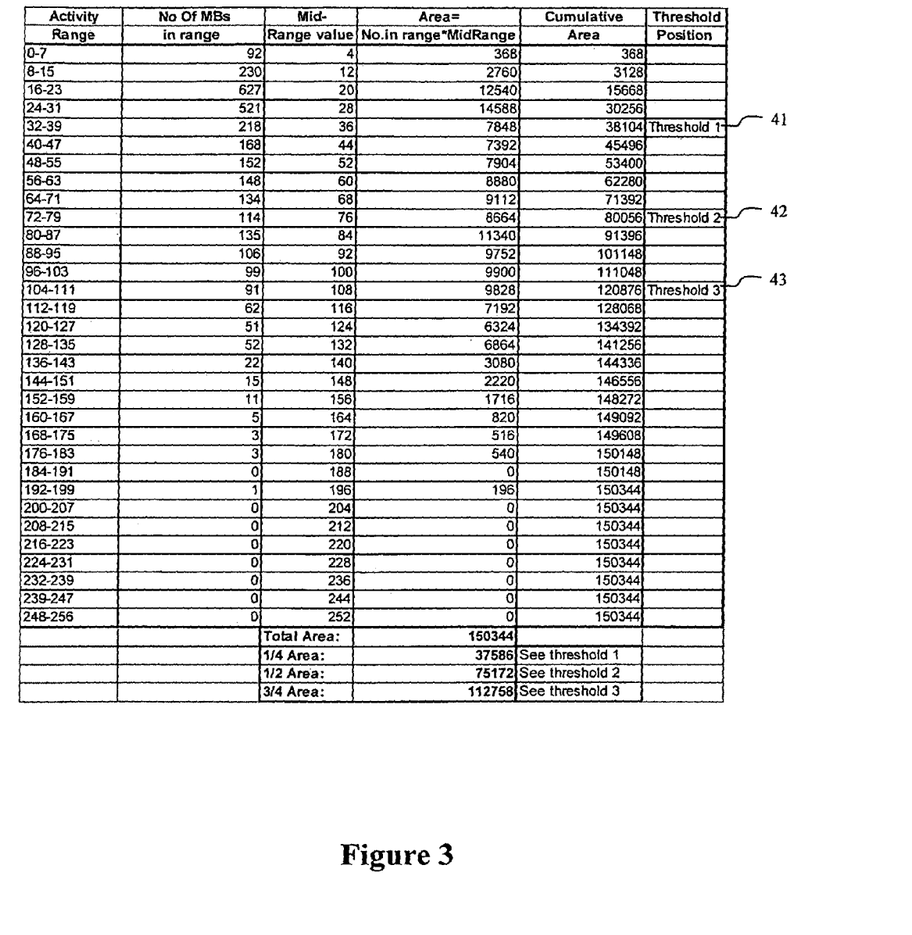
FIG. 3 is a table showing a grouping of picture Activity into four groups using thresholds dividing data into four equal portions.
Figure 4:
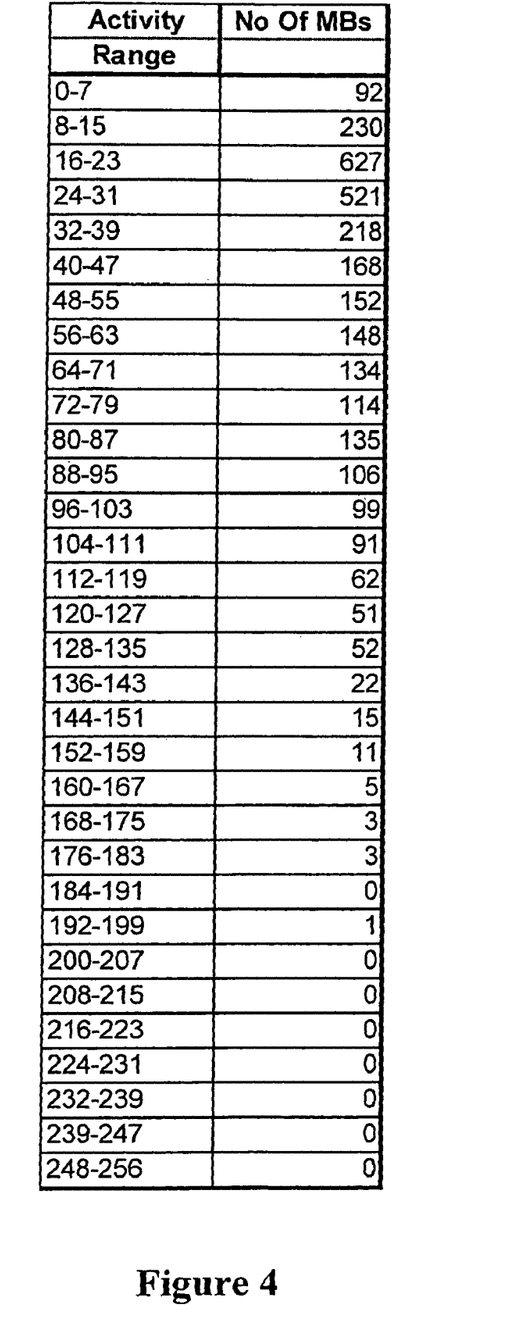
FIG. 4 is a table for construction of a histogram of MB Activity.
Figure 5:
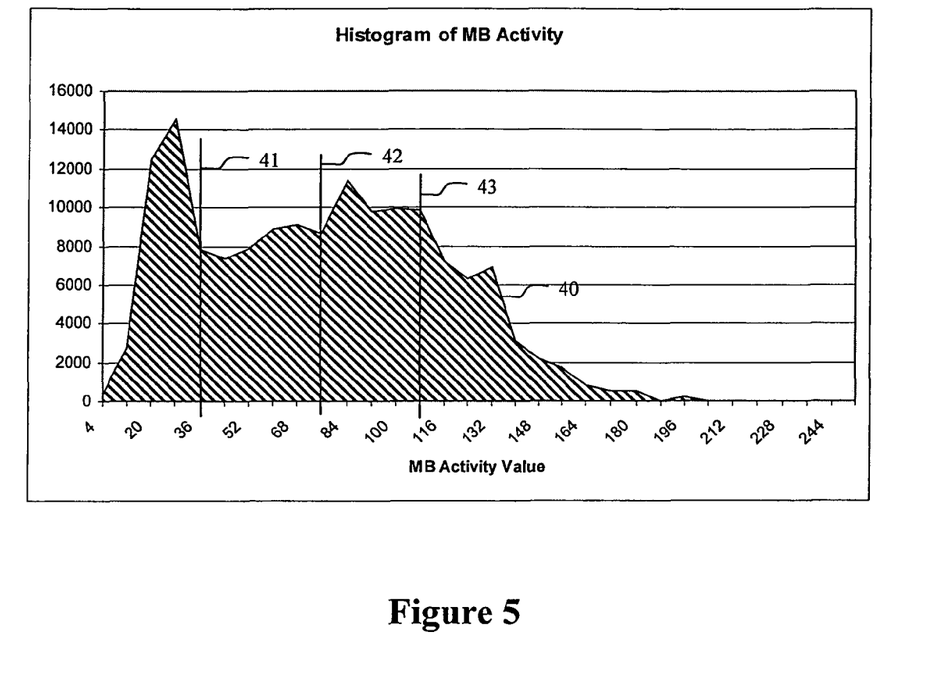
FIG. 5 is a histogram of MB Activity constructed from the table of FIG. 4.

For example, if the MBs are divided into four groups then the area in the histogram for each group is a quarter of the total histogram Activity area, that is, a quarter of the total coded coefficients in the picture before discarding and quantisation. An average Activity is then calculated for each group and the Activity of each MB is normalised to 256. FIGS. 3 to 5 give an example of a typical histogram for a picture and FIG. 3 particularly illustrates how the thresholds between groups are found at multiples of the Activity value 37,586 which in this example is one quarter of the total area 150,344 of the histogram.

Step 4

Selection criteria for a quantizer value for each group are based on an average Activity. Since the relation between MB_Size, the number of coefficients after quantisation, and Activity, the number of coefficients before quantisation, is assumed to be linear, the quantizer value for each group can be derived using its average Activity and the coefficients of the linear equation. A same number of bits is allocated to every group of MBs.

An example of how the quantizer value for each group is calculated to meet the Bits_allowed criterion is shown below. Assume that the picture sizes were estimated for four initial quantizer values (say Qp[0] . . . Qp[3], where Qp[0]>Qp[1]> Qp[2]>Qp[3]). Let a[0] . . . a[3], b[0] . . . b[3] be the corresponding values of the coefficients a and b of the linear functions relating the parameters MB_size to Activity illustrated in FIG. 2, that is, they are solutions to equations 2 and 3 for the four different quantizer values. The final average quantizer value (denoted by QP_group) for each group is calculated as follows:

Step 1: Calculate the number of bits taken by the average Activity of each group for all quantizer values in the estimation process in step 1, where i=0 corresponds to the lowest Qp value:

$$Avg\_Size[i]=a[i]*(Average\ Activity)+b[i] \quad 0 \leq i < 4$$

where:
Avg_Size[i]=the estimated size of a MB which has the average Activity for a particular group for the quantizer value whose index value is i and which is expressed through the parameters a and b.
Average Activity=average Activity of the group of MBs.
This one value of the parameter Average Activity gives several estimates for the average size of each MB as:
Avg_Size[0] . . . . Avg_Size[3] per MB, one for each selected quantizer value.

Step 2:

The rate control mechanism will set the number of bits available within the bit rate constraint for each complete picture. This affordable number of bits defines the permissible size of each picture and is denoted here as the parameter "Bits_Allocated". In FIG. 2 it is seen that the proposed pre-coding calculations estimate the size of each picture or MB from the measured current values of Activity and a selection of Qp values. From the several estimates produced in Step 1 above, i.e. Avg_size [0] to Avg_Size[3], a comparison of these values can be made with the parameter Bits_Allocated to obtain the precise value of Qp required to meet the Bits_Allocated criterion.

Normally it is expected that the value of Bits_Allocated will fall between the several calculated values of Avg_Size [i] but occasionally it may fall outside this range. Thus, the three cases that arise in the calculation of the required Qp will be when the value of Bits_Allocated falls within the range and when it exceeds the calculated range and when it is less. Thus, the three cases are calculated separately as follows:

Case 1:
If Bits_Allocated is >Avg_Size[0] then the selected values of Qp used to estimate several values of Avg_Size were too high and so some means of extrapolating the estimate outside the range is required. Such a means is embodied in the following equation:

$$QP\_group = QP[0] - \log_2(Bits\_Allocated/Avg\_Size[0])*6 \quad (5)$$

which gives the value of Qp applicable to the group as estimated from the values of QP[0] and the parameters Bits_Allocated and Avg_Size[0]. This relationship as defined, applies to the H.264 coding standard.

where
Bits_Allocated=the number of bits available per MB at the current bit rate. The
Bits_Allocated per MB may be set separately for each group, based on the Activity.

Case 2:
If Bits_Allocated is <Avg_Size[3] then the values of Qp selected were too low and a similar means of extrapolating the estimate beyond the available range is required using the following equation which has a same form to that used above:

$$QP\_group = QP[3] - \log_2(Bits\_Allocated/Avg\_Size[3])*6 \quad (6)$$

and

Case 3:
When the value of Bits_Allocated is somewhere between the estimates from the calculations for Avg_Value [i] and Avg_Size [k=i±1] then an interpolation between the values is used that employs the following equation, also derived from MPEG/ITU standards. This case is illustrated by the point A in FIG. 2. Here an interpolation is used between the calculated values either side of the value of Bits_Allocated.

$$QP\_group = (QP[j] - \log_2(Bits\_Allocated/Avg\_Size[j])*6 + QP[k] - \log_2(Bits\_Allocated/Avg\_Size[k])*6)/2 \quad (7)$$

where Avg_Size[j]≦Bits_Allocated<Avg_Size[k] and the values of j and k are found by comparing Bits_Allocated with Avg_Size[i, for i=0 to the maximum] where
Avg_Sze[j]=the average size of a MB in a group for the quantiser value j
Avg_Sze[k]=the average size of a MB in a group for the quantiser value k
Avg_Sze[ ]=the estimated size of a given MB for any value of i from 0 to its maximum.

The parameter "QP_group" is the quantiser value defined in the H264 standard, and is logarithmically, not linearly, related to Bits_Allocated and Avg_Size[i] and the factor 6 in equations 5-7 is specific to the MPEG-4 AVC International Standard ISO/IEC 14496-10. Other standards may require different relationships.

Extension to Coding P and B Pictures

The quantizer values selected by this method are for Intra pictures but they can also be used to select quantizer values for P and B pictures as well. The grouping can be done in same way for P and B pictures as for I pictures and quantizer values can be selected as:

| | |
|---|---|
| QP_group$_P$ = | QP_group$_I$ + Offset$_P$ |
| QP_group$_B$ = | QP_group$_I$ + Offset$_B$ | where Offset$_P$ and Offset$_B$ are functions of complexity and tools, such as Motion Estimation and its accuracy used to encode P and B pictures. The calculation of these parameters is necessary to include processing for P and B pictures in this invention.

This invention provides a method of selecting quantizer values before an intra frame is fully coded. Using such pre-selected quantizer values ensures that:
The fully coded intra-coded frame will not exceed a certain size.
The bit allocation between areas of lower and higher activities is optimised for consistent subjective quality across the entire picture.

The quantizer value information produced by this method for I pictures may also be used for selecting a quantizer value for B and P pictures. There is a relationship between the number of bits generated in an I picture for a given quantizer value Qp and those generated for the corresponding P and B pictures of the same GoP. Thus, although a means of improving the coding of I pictures has been discussed, it will be understood that the same technique may be used to improve the coding of P and B pictures.

The invention claimed is:

1. A method of obtaining a quantisation value for macroblocks of a picture in a video compression system comprising the steps of:
   a. estimating, in a processor, sizes in the transform domain of each macroblock of a picture in terms of a sum of all coded coefficients for a plurality of quantisation values;
   b. assuming, in the processor, a relationship between a size of a macroblock and Activity of the macroblock for each quantization value;
   c. dividing, in the processor, macroblocks into groups by Activity;
   d. determining, in the processor, an average Activity of each group; and
   e. calculating, in the processor, a quantisation value for each group from the assumed relationship between a number of bits per macroblock and Activity of the macroblock and the average Activity of the group, wherein the total number of bits available for all of the macroblocks in the coded picture is imposed by a predetermined bit rate of the video compression system.

2. The method as claimed in claim 1, wherein estimating, in the processor, sizes of a picture comprises using, in the processor, a simplified coding process, including a simple transform, quantisation and variable length coding.

3. The method as claimed in claim 2, comprising using, in the processor, an approximation of the H264 Context-adaptive binary arithmetic coding (CABAC) entropy encoding standard.

4. The method as claimed in claim 1, wherein estimating, in the processor, sizes of a picture dependent on a plurality of quantisation values comprises estimating, in the processor, over a range of quantizer values selected to cover most of a quantisation space of a compression standard.

5. The method as claimed in claim 1, wherein assuming, in the processor, a relationship comprises assuming, in the processor, a linear relationship in which constants may be determined by a least squares estimation.

6. The method as claimed in claim 1, wherein dividing, in the processor, macroblocks into groups by Activity comprises determining, in the processor, a normalised sum of coded coefficients as a measure of the Activity of each macroblock.

* * * * *